United States Patent [19]

Rapp

[11] Patent Number: 4,836,837

[45] Date of Patent: Jun. 6, 1989

[54] METAL COATED GLASS FIBERS

[75] Inventor: Charles F. Rapp, Newark, Ohio

[73] Assignee: Owens-Corning Fiberglas Corporation, Toledo, Ohio

[21] Appl. No.: 121,303

[22] Filed: Nov. 16, 1987

[51] Int. Cl.$^4$ .............................................. C03C 25/04
[52] U.S. Cl. ...................................... 65/3.3; 65/60.4; 65/324; 427/227; 427/377; 427/399
[58] Field of Search .................. 65/3.3, 3.2, 32, 60.4; 427/399, 377, 255.4, 255, 229, 227

[56]  References Cited

U.S. PATENT DOCUMENTS

| | | | |
|---|---|---|---|
| 2,772,987 | 12/1956 | Whitehurst et al. | 501/35 |
| 2,849,338 | 8/1958 | Whitehurst et al. | 428/388 |
| 2,963,739 | 12/1960 | Whitehurst | 65/3.3 |
| 2,979,424 | 4/1961 | Whitehurst | 427/377 |
| 3,414,465 | 12/1968 | Baak et al. | |
| 3,464,806 | 9/1969 | Seki et al. | 65/32 |
| 3,498,876 | 3/1970 | Baak et al. | |
| 3,508,894 | 4/1970 | Torok | 65/60.4 |
| 3,528,829 | 9/1970 | Baak et al. | |
| 3,659,915 | 5/1972 | Maurer et al. | 65/30 |
| 3,779,781 | 12/1973 | Baak et al. | |
| 3,790,360 | 2/1974 | Kato | 65/60.4 |
| 3,802,892 | 4/1974 | Pirooz | 65/32 |
| 3,873,328 | 3/1975 | Brueggemann et al. | |
| 3,876,407 | 4/1975 | Hirose et al. | 65/32 |
| 3,884,550 | 5/1975 | Maurer et al. | 65/3.11 |
| 3,907,532 | 9/1975 | Roberts | 65/2 |
| 3,933,454 | 1/1976 | DeLuca | 65/18.2 |
| 3,980,390 | 9/1976 | Yamamoto et al. | 350/96 |
| 4,169,182 | 9/1979 | Seki et al. | 65/33 |
| 4,414,281 | 11/1983 | Hoda | 501/3 |
| 4,525,387 | 6/1985 | Ebata et al. | 427/377 |

FOREIGN PATENT DOCUMENTS 1341533 12/1973 United Kingdom ................. 65/3.3

OTHER PUBLICATIONS

Thomas D. Callinan et al., NRL Report 4042, "The Electrical Properties of Glass Fiber Paper–II", Oct. 30, 1952.

J. D. Provance et al., *Journal of American Chemical Society*, vol. 54, No. 3, 147–151 (Mar. 1971).

Emile Plumat, *The Glass Industry*, Sep. 1981, "Thin Coatings on Glass", pp. 14–18.

*Primary Examiner*—Kenneth M. Schor
*Attorney, Agent, or Firm*—Patrick P. Pacella

[57] ABSTRACT

Provided is a process for making metal coated non-crystallized, amorphous glass fibers. The process fiberizes a glass containing a metal oxide such as cuprous oxide. The process then heat-treats the fibers to form a semiconductive layer of copper oxide on the surface. A subsequent reactive reduction step produces a semi-continuous film of metallic copper. This is conductive enough for many radar applications.

13 Claims, No Drawings

METAL COATED GLASS FIBERS

TECHNICAL FIELD

This invention relates to a process for producing metal coated glass fibers.

BACKGROUND OF THE INVENTION

The prior art is filled with processes for metallizing the surface of glass, ceramics and fibers. Past attempts bonded a metal coating to the surfaces. More recent developments recognize the value of forming the metal coating in situ on the surface of the glass ceramics. Often, the metal coating provide heat resistance, higher strength, stress corrosion resistance or abrasion resistance. More recently, the coated surfaces find utility in the microelectronics and printed circuit arts.

DISCLOSURE OF THE INVENTION

I have developed a way of forming a metallic coating on the surface of non-crystallized, amorphous glass fiber. I have developed a two step process which prevents crystallization of the amorphous glass fibers. The first step heat treats amorphous glass fibers in an oxidizing atmosphere to form a metallic oxide coating on the surface without crystallizing the glass. The second step heats the metal oxide coating in a reducing atmosphere to form a metal coating. The resulting fibers are potential candidates for radar applications. The fibers may also have industrial uses for shielding against electromagnetic interference (EMI), radio frequency interference (RFI), and electrostatic discharge (ESD) and at the same time provide reinforcement.

BEST MODE OF CARRYING OUT INVENTION

A glass-containing copper oxide, was fiberized and then heat-treated to form a layer of copper oxide on the surface of the fiber. A subsequent reactive reduction step produces a semi-continuous film of metallic copper. This is conductive enough for radar applications. Electroplating may be used to further increase the conductivity for some applications such as EMI shielding.

Generally, we carried out the oxidizing heating at a temperature below 700° C. for a time ranging from 6 seconds to 6 minutes. Preferably, we carried out this heating at a temperature of 250° to 450° C. for a time of 6 seconds to 5 minutes. More specifically, the temperature ranged from 300° to 450° C. for a time of 6 seconds to 4 minutes.

We carried out the reducing heating at a temperature below 600° C. for a time of 10 seconds or less. Preferably, we carried out this heating at a temperature ranging from 300° to 500° C. for a time of 2 to 8 seconds.

Generally, the glass compositions contained 10 to 70 weight percent of the reducible metal oxide, preferably 10 to 40 weight percent.

The metal oxides we can employ besides CuO ($Cu_2O$), include $Ag_2O$, PbO, CoO, $Sb_2O_3$MnO, $Cr_2O_3$, $Fe_2O_3$, NiO or $V_2O_5$. Preferably, the metal oxide is CuO.

Generally, the glass fibers had the following composition:

| Oxide | Weight Percent |
|---|---|
| $SiO_2$ | 40.0 to 55.0 |
| CuO | 10.0 to 50.0 |
| $Al_2O_3$ | 0 to 30.0 |
| CaO | 5 to 20.0 |
| $B_2O_3$ | 0 to 10.0 |

Preferably, the glass compositions are:

| Oxide | Weight Percent |
|---|---|
| $SiO_2$ | 45.0 to 50.0 |
| CuO | 20.0 to 40.0 |
| $Al_2O_3$ | 5.0 to 20.0 |
| CaO | 5.0 to 15.0 |
| $B_2O_3$ | 2.0 to 8.0 |

A forming trial focused on developing a heat removable size, and we selected a PVA-paraffin system. Another forming trial yielded about 40 pounds each of rovable forming cakes of chemical grade and plant grade batch formulated glass. Both formulations were found to rove and heat-treat well.

INDUSTRIAL APPLICABILITY

We prepared conductive glass fibers as follows:

I. Glass Composition: Copper Glass

| Wt. % | Oxide | Source |
|---|---|---|
| 47.2 | $SiO_2$ | Supersil |
| 24.0 | $Cu_2O$ | Black Copper Oxide CuO |
| 12.5 | $Al_2O_3$ | Calcined Alumina |
| 9.8 | CaO | Pulv. Limestone, $CaCO_3$ |
| 5.4 | $B_2O_3$ | Anhydrous Boric Acid, $B_2O_3$ |

II. Melting

Mixed batch is crucible (Pt alloy) melted at 2850° F. for 2½ hours. Cullet is crushed and mixed for remelt at 2850° F., 2½ hours. Cullet sized for remelt forming operation. One also could melt the batch in a suitable premelt furnace to directly feed the bushing.

III. Forming

Typically, I form the textile glass fibers using conventional bushings. While I can form a total range of fiber diameters, I prefer that the bushing deliver average fiber diameters ranging from 6 to 10 microns.

IV. Size

Belt application of an aqueous size allows for high speed roving as well as size removal via appropriate heat treatment.

Polyvinyl Alcohol, film former Gelvatol 20/30: 2.24%

Paraffin Wax Emulsion, Velvaton 77-70: 1.14%

Polyethylene Glycol, lubricant, Carbowax 300: 0.30%

Curing achieved at 270° F. for 10 hours.

V. Roving

I preferably form the roving with low tension pull and few friction points (guide eyes) to minimize damage.

VI. Heat Treatment—An In-Line Strand Process

A. Size Removal

Next, I thermally treat the roving at 500° C. under inert gas (helium) to vaporize size from glass surface, a necessary step in the development of metallic conducting film. The burn off also can be in air followed by slight bending of the strand to separate the individual fibers. In line residence times at as little as 6 seconds are sufficient. Burn off at 350° C. also can be used.

B. Oxidation

Thermal oxidation of the glass results in (1) the migration of $Cu^+$ to the surface, and (2) oxidation of $Cu^+$ to $Cu^{+2}$ to form a copper oxide (CuO) film on each other fiber. Proper oxidation requires that organic size removal be affected prior to oxidation to insure that the fiber surface is directly in contact with $O_2$. This oxide film is subsequently converted to a semi-continuous copper film on each fiber. Size removal also promotes "filamentization" of the strand, ensuring individual fibers rather than film bonded strands.

C. Reduction

Hydrogen reduction in 25 to 100% $H_2$ in helium at 450° C. for 5 seconds are sufficient to form a highly conductive film on each fiber. Strand resistances for a 5500 fiber tow of 7.2 micron fibers is typically less than one ohm/cm length, equivalent to similarly sized graphite fiber tows.

VII. Packaging

An effective package appears to be a moisture barrier film with a desiccant package added for insurance.

VIII. Electroplating

The conductive glass fiber tow can be electroplated using any standard electroplating bath. Copper cyanide baths work well for copper deposition on the copper film resulting from heat treatment. Iron and zinc have also been deposited on the strand.

With our processing oxidizing and reduction furnace temperatures, heat treatment line speeds have been increased up to a factor of 20 over the previous oxidize-electroplate system. We achieved sufficient strand conductivities on a production scale.

Strengths of the heat-treated products are acceptable. Single fiber specimens taken from the roving package indicate a mean unheat-treated strength of about 300,000 psi for the forming room product. Heat-treated mean strengths of about 250,000 psi have been observed.

Conductivity of the new material is excellent, and we had no problems with electroplating where desired.

I claim:

1. A process for producing non-crystallized, amorphous glass fibers having a metallic coating thereon comprising the steps of preparing a glass batch composition comprising at least one reducible metal oxide selected from the group consisting of CuO, $Cu_2O$, $Ag_2O$, PbO, CoO, $Sb_2O_3$, MnO, $Cr_2O_3$, $Fe_2O_3$, NiO and $V_2O_5$, and a balance of glass raw materials, melting the glass batch composition to form a substantially amorphous glass melt, fiberizing and solidifying the resulting molten glass composition, heating the resulting amorphous glass fibers in an oxidizing atmosphere at a temperature below about 700° C. for a time range from about six seconds to about six minutes whereby the metal ions of the reducible metal oxide migrate to the surface of the glass fibers and are oxidized to form a metallic oxide coating on the surface of the glass fibers under conditions which prevent the crystallization of the amorphous glass fibers, and subsequently heating the metal oxide coated glass fibers in a reducing atmosphere to convert the metal oxide coating to a metal coating on the surface of the glass fibers.

2. A process according to claim 1 wherein the oxidizing heating is carried out at a temperature ranging from 250° to 450° C. for a time ranging from six seconds to five minutes.

3. A process according to claim 1 wherein the oxidizing heating is carried out at a temperature ranging from 300° to 450° C. for a time ranging from six seconds to four minutes.

4. A process according to claim 1 wherein the reducing heating is carried out at a temperature below 600° C. for a time of ten seconds or less.

5. A process according to claim 1 wherein the reducing heating is carried out at a temperature ranging from 300° to 500° for a time ranging from two to eight seconds.

6. A process according to claim 1 wherein the glass composition contains from 10 to 70 weight percent of reducible metal oxide.

7. A process according to claim 1 wherein the glass composition contains 10 to 40 weight percent metal of reducible metal oxide.

8. A process according to claim 1 wherein the metal oxide is $Cu_2O$, FeO, $Ag_2O$, PbO.

9. A process according to claim 1 wherein the metal oxide is $Cu_2O$ or FeO.

10. A process according to claim 1 wherein the metal oxide is $Cu_2O$.

11. A process according to claim 1 wherein the glass composition is:

| Oxide | Weight Percent |
|---|---|
| $SiO_2$ | 40.0 to 55.0 |
| CuO | 10.0 to 50.0 |
| $Al_2O_3$ | 0 to 30.0 |
| CaO | 5.0 to 20.0 |
| $B_2O_3$ | 0 to 10.0 |

12. A process according to claim 1 wherein the glass composition is:

| Oxide | Weight Percent |
|---|---|
| $SiO_2$ | 45.0 to 50.0 |
| CuO | 20.0 to 40.0 |
| $Al_2O_3$ | 5.0 to 20.0 |
| CaO | 5.0 to 15.0 |
| $B_2O_3$ | 2.0 to 8.0 |

13. A process according to claim 1 wherein the glass composition is:

| Oxide | Weight Percent |
|---|---|
| $SiO_2$ | 47.2 |
| CuO | 24.0 |
| $Al_2O_3$ | 12.5 |
| CaO | 9.8 |
| $B_2O_3$ | 5.4 |

* * * * *